(12) United States Patent
Kawabata et al.

(10) Patent No.: US 10,868,932 B2
(45) Date of Patent: Dec. 15, 2020

(54) IMAGE READING DEVICE

(71) Applicant: SEIKO EPSON CORPORATION, Tokyo (JP)

(72) Inventors: Seiji Kawabata, Matsumoto (JP); Takeshi Aoki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/662,550

(22) Filed: Oct. 24, 2019

(65) Prior Publication Data

US 2020/0137249 A1 Apr. 30, 2020

(30) Foreign Application Priority Data

Oct. 24, 2018 (JP) ................................ 2018-199835

(51) Int. Cl.
*H04N 1/00* (2006.01)
*H04N 1/107* (2006.01)

(52) U.S. Cl.
CPC ..... *H04N 1/00793* (2013.01); *H04N 1/00551* (2013.01); *H04N 1/00596* (2013.01);
(Continued)

(58) Field of Classification Search
CPC . B41J 13/103; B41J 3/60; B41J 11/007; B41J 13/02; B41J 11/0095; B41J 13/0027; B41J 13/0045; B41J 13/009; B41J 13/025; B41J 2029/3937; B41J 29/02; B41J 29/023; B41J 29/13; B41J 29/393; B41J 2/01; B41J 11/42; B41J 19/18; H04N 2201/0081; H04N 1/00588; H04N 1/00551; H04N 1/00602; H04N 1/00628; H04N 2201/0091; H04N 1/00554; H04N 1/00559; H04N 1/00591; H04N 1/00716; H04N 1/00734; H04N 1/00909; H04N 1/02409; H04N 1/123; H04N 1/1235; H04N 1/193; H04N 2201/006; H04N 2201/0062;
(Continued)

(56) References Cited

U.S. PATENT DOCUMENTS 5,579,129 A * 11/1996 Iwata ................... H04N 1/0057
271/10.12
2004/0057079 A1* 3/2004 Ohsawa ............... G03G 15/602
358/2.1
(Continued)

FOREIGN PATENT DOCUMENTS

JP 2014-120854 6/2014

*Primary Examiner* — Negussie Worku
(74) *Attorney, Agent, or Firm* — Workman Nydegger

(57) ABSTRACT

An image reading device includes: a first reading unit that is provided at an intermediate position of a transport path and that reads an image of a document transported on the transport path; and a transport unit that is disposed on the transport path further upstream than the first reading unit and that transports the document to the first reading unit. The transport unit includes a third driving roller and third driven rollers that hold the document between the third driving roller and the third driven rollers. The third driving roller is provided on a frame main body, and the third driven rollers are provided on a holder member. When a cover is displaced from a closed position to an open position, the holder member is moved so as to separate the third driven rollers from the third driving roller.

6 Claims, 8 Drawing Sheets

(52) U.S. Cl.
CPC ..... *H04N 1/00602* (2013.01); *H04N 1/00615* (2013.01); *H04N 1/00824* (2013.01); *H04N 1/1077* (2013.01); *H04N 2201/0081* (2013.01)

(58) Field of Classification Search
CPC ... H04N 2201/0063; H04N 2201/0094; H04N 1/0062; H04N 1/00689; H04N 1/00692; H04N 1/00694; H04N 1/00779; H04N 1/00896; H04N 1/00904; B43M 3/04; G03G 15/08; G03G 15/0849; G03G 15/0856; G03G 15/0862; G03G 15/0887; G03G 15/0889; G03G 15/0893; G03G 15/235; G03G 15/553; G03G 15/6564; G03G 15/6567; G03G 21/0017; G03G 2215/00721; G03G 2215/0888; G03G 2221/183; G03G 15/0801; G03G 15/30; G03G 15/607; G03G 21/0041
USPC .......................................... 358/498, 497, 496
See application file for complete search history.

(56) References Cited

U.S. PATENT DOCUMENTS

| | | | |
|---|---|---|---|
| 2006/0023053 A1* | 2/2006 | Sasa | B41J 13/0027 347/104 |
| 2008/0265489 A1* | 10/2008 | Ng | H04N 1/00631 271/114 |
| 2008/0309983 A1* | 12/2008 | Mizutani | H04N 1/4051 358/3.13 |
| 2013/0215481 A1* | 8/2013 | Hayasaka | H04N 1/00904 358/498 |
| 2013/0321885 A1* | 12/2013 | Adachi | B65H 9/006 358/498 |
| 2014/0029962 A1* | 1/2014 | Shimizu | G03G 15/0856 399/27 |
| 2014/0292984 A1* | 10/2014 | Nakata | B41J 3/60 347/104 |
| 2019/0068823 A1* | 2/2019 | Ito | H04N 1/121 |
| 2019/0389680 A1* | 12/2019 | Miyagawa | B65H 7/12 |

* cited by examiner

IMAGE READING DEVICE

The present application is based on, and claims priority from JP Application Serial Number 2018-199835, filed Oct. 24, 2018, the disclosure of which is hereby incorporated by reference herein in its entirety.

BACKGROUND

1. Technical Field

The present disclosure relates to an image reading device.

2. Related Art

To date, an image reading device that reads an image on a paper sheet is widely known. For example, a device described in JP-A-2014-120854 includes an auto document feeder (ADF) that transports a paper sheet, and reads an image on the paper sheet by an image reading sensor provided on a transport path for the paper sheet while the ADF transports the paper sheet. In addition, this device is provided with an ADF cover that opens the upper side of the transport path for the paper sheet at the time of maintenance or paper jam.

However, in the device described in the above document, when the ADF cover is moved between an open position and a closed position, it is highly likely that a pinch roller supported by the ADF cover may collide with a transport roller and damage the transport roller.

SUMMARY

An image reading device according to an aspect of the disclosure includes: a medium support portion that supports a medium; a supply roller that supplies the medium; a transport path through which the medium supplied by the supply roller passes; a cover that is displaced between an open position in which the transport path is open and a closed position in which the transport path is closed; a reading unit that reads an image on the medium transported on the transport path; and a transport unit that is disposed on the transport path further upstream than the reading unit and that transports the medium to the reading unit, in which the transport unit includes a driving roller, and a driven roller that nips the medium between the driving roller and the driven roller, in which the driving roller is provided in a first unit, the driven roller is provided in a second unit, and when the cover is displaced from the closed position to the open position, the second unit is moved so as to separate the driven roller away from the driving roller.

DESCRIPTION OF EXEMPLARY EMBODIMENTS

Hereinafter, an embodiment of a multi-function machine including an image reading device will be described with reference to the drawings.

Figure 1:
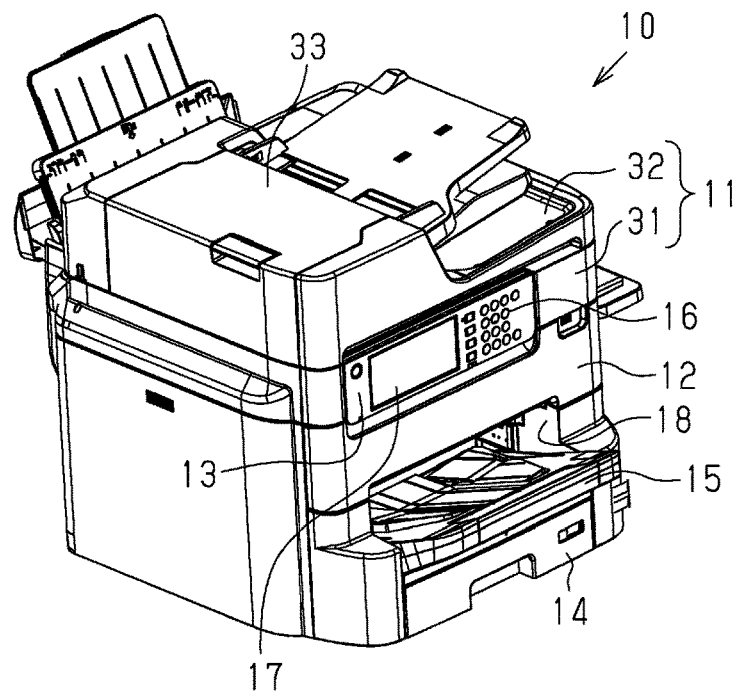
FIG. 1 is a perspective view of a multi-function machine.
Figure 2:
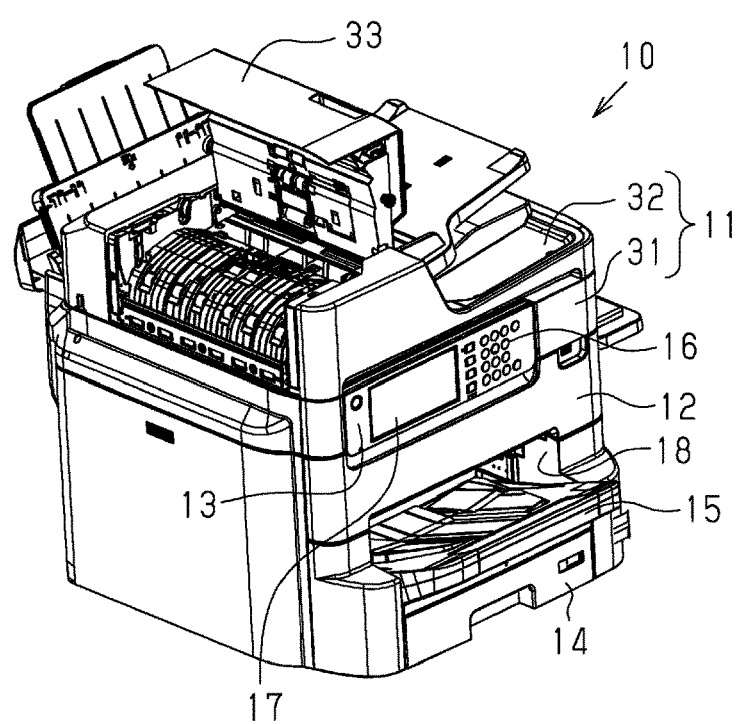
FIG. 2 is a perspective view of the multi-function machine when a cover is in an open position.

As illustrated in FIGS. 1 and 2, a multi-function machine 10 includes an image reading device 11 capable of reading an image and a recording device 12 capable of recording an image. The multi-function machine 10 is configured such that the image reading device 11 and the recording device 12 are superposed in the up-down direction. The image reading device 11 is disposed on top of the recording device 12. The image reading device 11 can be opened and closed with respect to the recording device 12.

In the multi-function machine 10, a surface thereof on which an operation panel 13 is disposed is a front surface, and a surface thereof on the opposite side is a rear surface. The front and rear surfaces of the multi-function machine 10 are surfaces that extend in the width direction and up-down direction of the multi-function machine 10. An upper surface and a lower surface of the multi-function machine 10 are surfaces that extend in the width direction and depth direction of the multi-function machine 10. Side surfaces, which are surfaces different from the front surface, rear surface, upper surface, and lower surface of the multi-function machine 10 are surfaces that extend in the up-down direction and depth direction of the multi-function machine 10. Therefore, the width direction, up-down direction, and depth direction of the multi-function machine 10 indicate different directions.

In this specification, when the multi-function machine 10 is viewed from the front side, the right end of the multi-function machine 10 in the width direction is a first end, and the left end of the multi-function machine 10 in the width direction is a second end. In addition, the width direction, up-down direction, and depth direction of the multi-function machine 10 coincide with the width direction, up-down direction, and depth direction of the image reading device 11 and the recording device 12.

The recording device 12 is configured to eject, for example, a liquid such as ink. The recording device 12 includes the operation panel 13 through which overall operation of the multi-function machine 10 can be performed, a media cassette 14 through which a medium can be set in the recording device 12, and a discharge tray 15 to which the medium, on which an image has been recorded, is discharged.

The operation panel 13 forms a portion of a casing of the recording device 12. The operation panel 13 has a plurality of buttons 16 and a display screen 17. The buttons 16 include, for example, a power button that can switch on and off the power of the multi-function machine 10. The display screen 17 can display various types of information of the multi-function machine 10.

A discharge port 18 is provided below the operation panel 13. The discharge port 18 opens in a rectangular shape on a front surface of the recording device 12. The discharge port 18 has substantially the same width as the operation panel 13 in the width direction of the multi-function machine 10.

The media cassette 14 is provided so as to protrude forward from the discharge port 18. The media cassette 14 is detachable from the front of the recording device 12. The media cassette 14 can house media in a stacked state. The media are set in the recording device 12 by mounting the media cassette 14 housing the media in the recording device 12. In the present embodiment, the media housed in the media cassette 14 are rectangular paper sheets.

The discharge tray 15 is provided so as to protrude forward from the discharge port 18. The discharge tray 15 is disposed such that the discharge tray 15 and the media cassette 14 mounted on the recording device 12 are superposed in the up-down direction, and is located above the media cassette 14. The media on which images have been recorded by the recording device 12 are discharged to the discharge tray 15 through the discharge port 18.

The image reading device 11 is configured as, for example, a scanner, and includes a document table 31 for setting a document, and an ADF unit 32 functioning as a cover for the document table 31. The image reading device 11 is configured such that the document table 31 and the ADF unit 32 are superposed in the up-down direction. The ADF unit 32 is disposed on top of the document table 31.

The ADF unit 32 is configured to open and close with respect to the document table 31 with an end portion on the rear surface side of the image reading device 11 as a fulcrum. The image reading device 11 reads an image such as a character, a photograph, or the like recorded on a document set between the document table 31 and the ADF unit 32. In the present embodiment, the document set in the image reading device 11 is a rectangular paper sheet.

A cover 33 that opens and closes a transport path T for the document provided inside the ADF unit 32 is provided on top of the ADF unit 32. In FIG. 1, the cover 33 is positioned at a closed position in which the transport path T for the document is closed. The cover 33 forms a portion of an upper surface of the ADF unit 32 when in the closed position. In FIG. 2, the cover 33 is positioned at an open position in which the transport path T for the document is open. When the cover 33 is in the open position, it is possible for the user to take out a document that has caused a transport jam from the transport path T.

Figure 3:
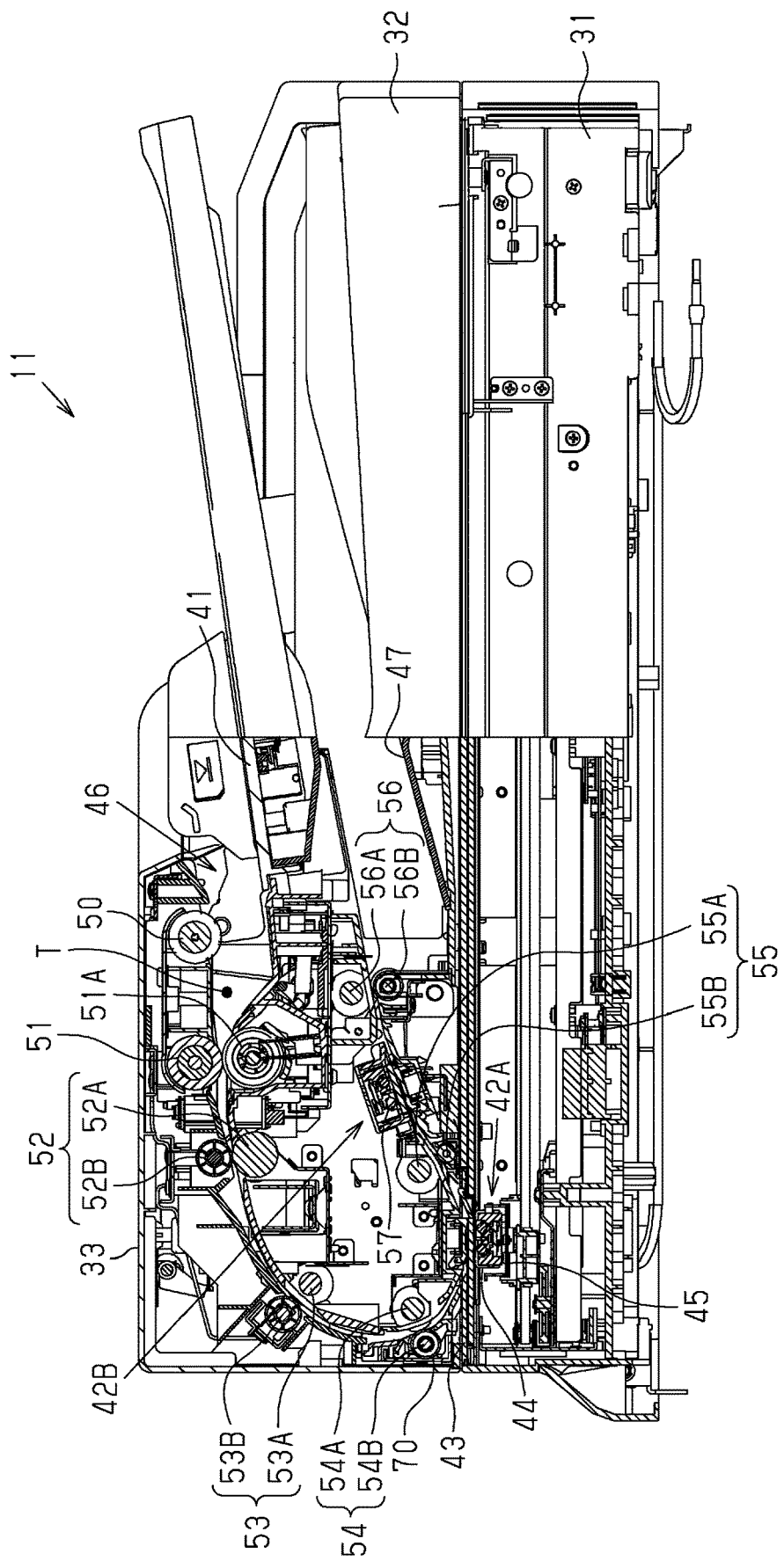
FIG. 3 is a partial cutaway sectional view of an image reading device.

As illustrated in FIG. 3, the image reading device 11 is configured to read not only the image of a document set between the document table 31 and the ADF unit 32 but also the image of a document loaded on a loading plate 41. The ADF unit 32 has a function of sequentially supplying a document to a first reading unit 42A and a second reading unit 42B in order to cause the first reading unit 42A and the second reading unit 42B to read the document loaded on the loading plate 41.

More specifically, the image reading device 11 includes the first reading unit 42A that reads an image on a first side of a document. The first reading unit 42A is provided inside the document table 31, and is disposed in an area immediately below a transparent plate 43. The first reading unit 42A reads the image on the first side of the document located on the upper surface of the transparent plate 43 through the transparent plate 43.

The first reading unit 42A includes a first sensor 44 that reads the image on the first side of the document, and a carriage 45 on which the first sensor 44 is mounted. The carriage 45 is movable in the width direction of the image reading device 11 inside the document table 31. That is, the first reading unit 42A is movable in the width direction of the image reading device 11 in a region directly below the transparent plate 43. The first reading unit 42A reads the image on the first side of the document by scanning the document located on the upper surface of the transparent plate 43.

The first reading unit 42A is located at a reading position closer to the second end of the image reading device 11 in the width direction when reading the image on the first side of the document. When the image reading device 11 is waiting to receive an operation from a user, for example, when not reading the image on the first side of the document, the first reading unit 42A stands by at a standby position different from the reading position in the width direction of the image reading device 11.

The image reading device 11 includes the loading plate 41 on which documents can be loaded, a transport unit 46 that transports the documents stacked on the loading plate 41, and a placement plate 47 on which the documents transported by the transport unit 46 are placed. The loading plate 41, the transport unit 46, and the placement plate 47 are provided in the ADF unit 32.

The loading plate 41 and the placement plate 47 are arranged so as to be superposed in the up-down direction. The loading plate 41 is located above the placement plate 47. The loading plate 41 and the placement plate 47 extend at an angle so as to gradually increase in height from the second end to first end of the image reading device 11 in the width direction.

The transport unit 46 transports the documents loaded on the loading plate 41 along the transport path T. The transport path T is provided in the ADF unit 32 and extends from the loading plate 41 toward the placement plate 47 so as to be curved in a U shape. The transport unit 46 transports the documents loaded on the loading plate 41 toward the placement plate 47 along the transport path T.

The transport unit 46 is configured by a plurality of rollers. The rollers forming the transport unit 46 transport the documents by rotating. These rollers are disposed along the transport path T. In the transport path T of the transport unit 46, in order from the loading plate 41 side to the placement plate 47 side, a supply roller 50, a separate roller 51, first guide rollers 52, second guide rollers 53, third guide rollers 54, feed rollers 55, and discharge rollers 56 are disposed.

The supply roller 50 is disposed in the transport path T at a position close to the loading plate 41. The supply roller 50 is capable of coming into contact with a document loaded on the loading plate 41 from above. The supply roller 50 feeds the document from the loading plate 41 to the transport path T by rotating while being in contact with the document. Therefore, when a plurality of documents are loaded on the loading plate 41, the supply roller 50 supplies the documents in order from the document located at the top.

The separate roller 51 separates and transports the plurality of documents one by one when the documents supplied from the supply roller 50 are superposed in a plurality. In order to achieve this, a separation roller 51A for separating the documents is disposed at a position facing the separate roller 51. The separate roller 51 and the separation roller 51A are disposed so as to interpose the transport path T.

The separate roller 51 contacts the documents transported on the transport path T from above. The separation roller 51A contacts the documents transported on the transport path T from below. When the separate roller 51 transports the documents, the separation roller 51A separates the documents one by one by applying a frictional force thereto.

The first guide rollers 52 include a first driving roller 52A and a first driven roller 52B, and rotate in a state of nipping the document separated by the separate roller 51 and the separation roller 51A. The first guide rollers 52 transport the document toward the second guide rollers 53 by applying a driving force to the document being transported.

The second guide rollers 53 include a second driving roller 53A and a second driven roller 53B, and rotate in a state of nipping the document transported by the first guide rollers 52. The second guide rollers 53 transport the document to the third guide rollers 54 by applying a driving force to the document being transported.

The third guide rollers 54 include a third driving roller 54A and third driven rollers 54B, and rotate in a state of nipping the document transported by the second guide rollers 53. The third guide rollers 54 transport the document to the feed rollers 55 by applying a driving force to the document being transported.

The feed rollers 55 include a feed driving roller 55A and a feed driven roller 55B, and rotate in a state of nipping the document transported by the third guide rollers 54. The feed rollers 55 transport the document transported from the third guide rollers 54 toward the discharge rollers 56 by applying a driving force to the document being transported.

The discharge rollers 56 include a discharge driving roller 56A and a discharge driven roller 56B, and rotate in a state of nipping the document transported by the feed rollers 55. The discharge rollers 56 discharge the document toward the placement plate 47 by applying a driving force to the document being transported.

The second reading unit 42B that reads an image on a second side of the document transported on the transport path T is disposed at a position between the feed rollers 55 and the discharge rollers 56 in the transport path T. The second side of the document is a surface on the opposite side to the first side of the document. The second reading unit 42B includes a second sensor 57 that reads an image on the second side of the document.

Figure 4:
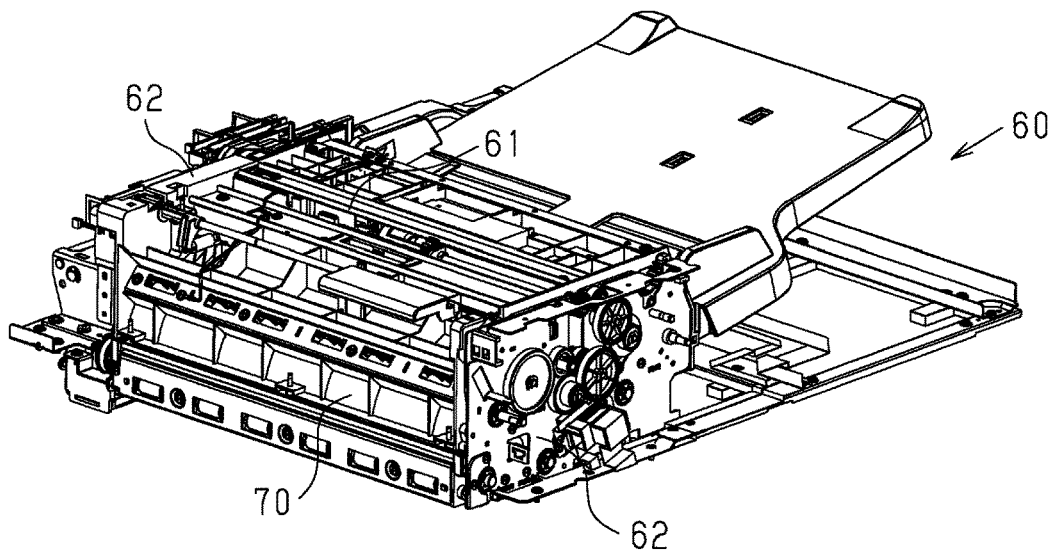
FIG. 4 is a perspective view of a frame structure of the image reading device.

FIG. 4 illustrates a frame structure 60 in which the casing has been removed from the image reading device 11. As illustrated in the figure, the frame structure 60 of the image reading device 11 includes a frame main body 61 as an example of a first unit forming the transport path T, and a pair of support frames 62 disposed on both sides of the frame main body 61 in the width direction. Between the pair of the support frames 62, a holder member 70 is supported so as to be rotatable as an example of a second unit that holds the third driven rollers 54B that form the third guide rollers 54.

Figure 5:
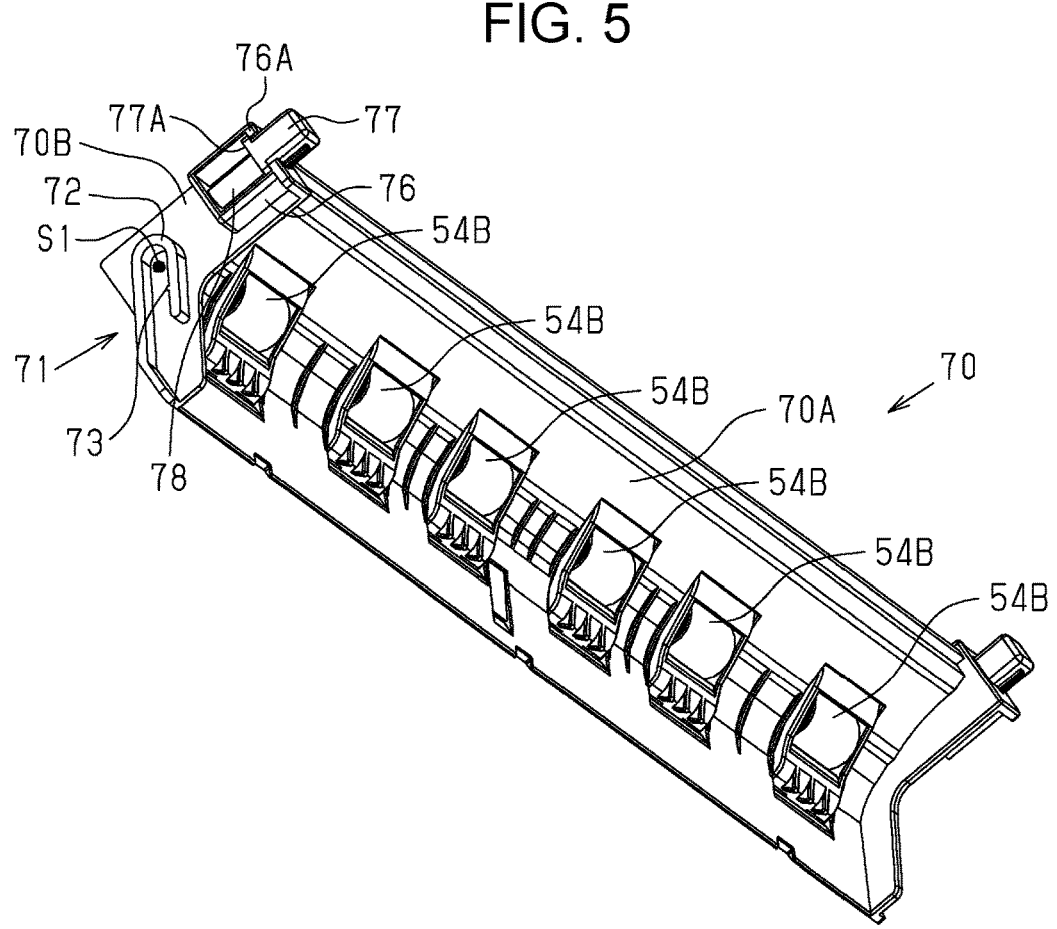
FIG. 5 is a perspective view of a holder member.
Figure 6:
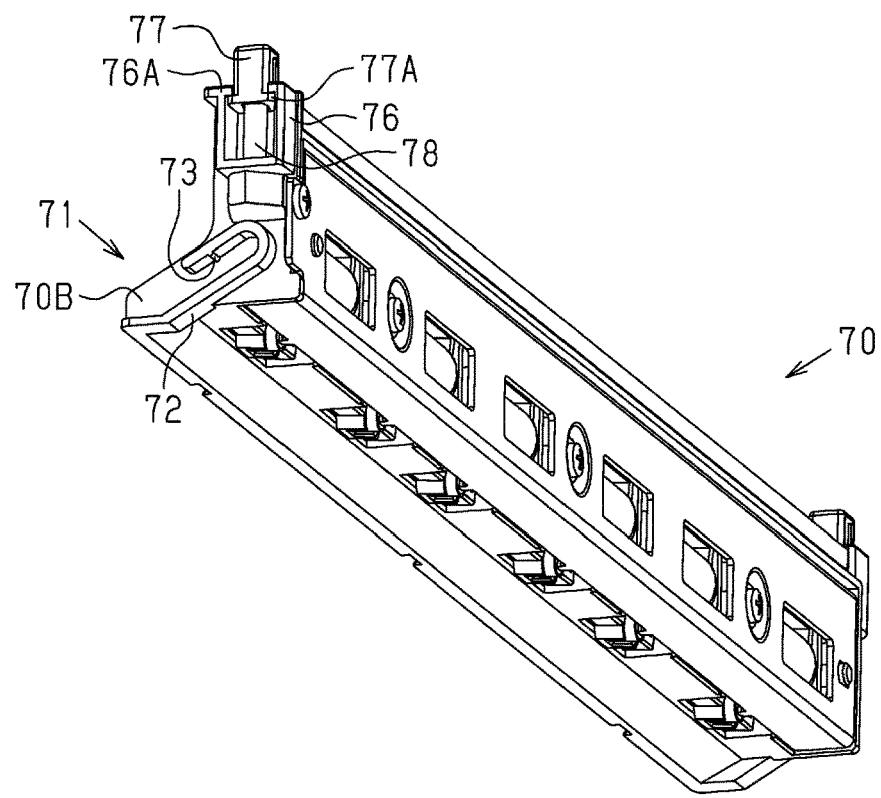
FIG. 6 is a perspective view of the holder member.

As illustrated in FIGS. 5 and 6, the holder member 70 has a first surface 70A, which is a surface along the longitudinal direction of the holder member 70. On the first surface 70A of the holder member 70, the third driven rollers 54B are arranged in parallel at predetermined intervals in the longitudinal direction of the holder member 70. In addition, the holder member 70 has second surfaces 70B, which are both side surfaces of the holder member 70 in the longitudinal direction. Each of the second surfaces 70B of the holder member 70 is provided with a guide portion 71.

The guide portion 71 of the holder member 70 is formed by a ridge 72 which curves and extends so as to be substantially U-shaped. A recessed portion space S1 surrounded by the ridge 72 is elongated in one direction, one end side in the longitudinal direction is closed, and the other end side in the longitudinal direction is open. The longitudinal direction of the recessed portion space S1 coincides with the direction that obliquely intersects the vertical direction, and one end side in the longitudinal direction is located above in the vertical direction, and the other end side in the longitudinal direction is located below in the vertical direction. In addition, a locking portion 73 that protrudes is provided on the inner side surface of the recessed portion space S1 in the ridge 72.

Figure 7:
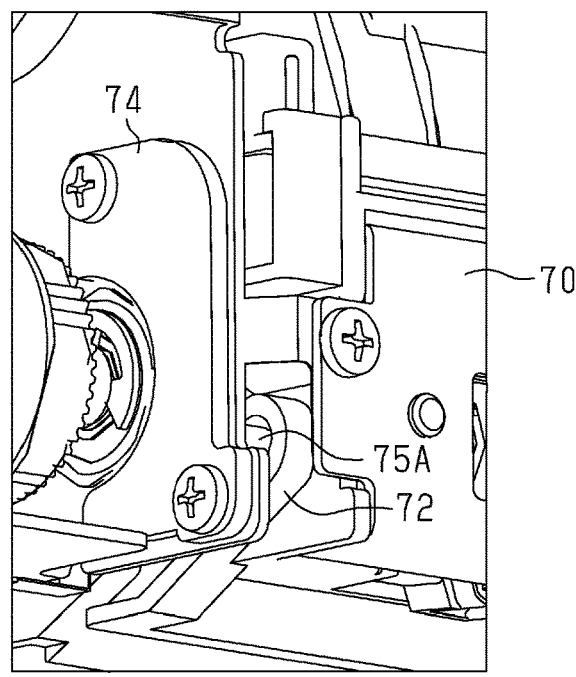
FIG. 7 is an enlarged view of a main portion of a peripheral structure of the holder member.

As illustrated in FIG. 7, a pin frame 74 is provided on the outside of the holder member 70 in the width direction of the image reading device 11. The pin frame 74 is fastened to, for example, the pair of the support frames 62. The pin frame 74 has a first guide pin 75A and a second guide pin 75B protruding inward in the width direction of the image reading device 11. In the present embodiment, the pin frame 74 is provided with the first guide pin 75A and the second guide pin 75B on both sides in the width direction of the image reading device 11 (see FIG. 9 and the like). The first guide pin 75A and the second guide pin 75B have a cylindrical shape, and the tip end portions of the first guide pin 75A and the second guide pin 75B are inserted into the recessed portion space S1 of the holder member 70. In this case, the outer diameter of the tip end portions of the first guide pin 75A and the second guide pin 75B is substantially the same as the opening width of the recessed portion space S1 in the direction intersecting the longitudinal direction. Therefore, the movement direction of the first guide pin 75A and the second guide pin 75B is restricted to the direction along the longitudinal direction of the recessed portion space S1.

In addition, as illustrated in FIGS. 5 and 6, a support frame 76, which is substantially U-shaped and whose upper side is open, is provided on the second surface 70B of the holder member 70. A pressing member 77, which is rod-like, is housed in the support frame 76 in such a manner that the tip end portion thereof protrudes from the support frame 76. In addition, a flange portion 77A, which has an annular shape, is provided at the base end of the pressing member 77. The flange portion 77A of the pressing member 77 is locked in the longitudinal direction of the pressing member 77 by a rib 76A provided on the opening edge of the support frame 76. In addition, a coil spring 78 as an example of an urging member that urges the pressing member 77 upward in the vertical direction is provided between the inner bottom surface of the support frame 76 and the pressing member 77.

Figure 8:
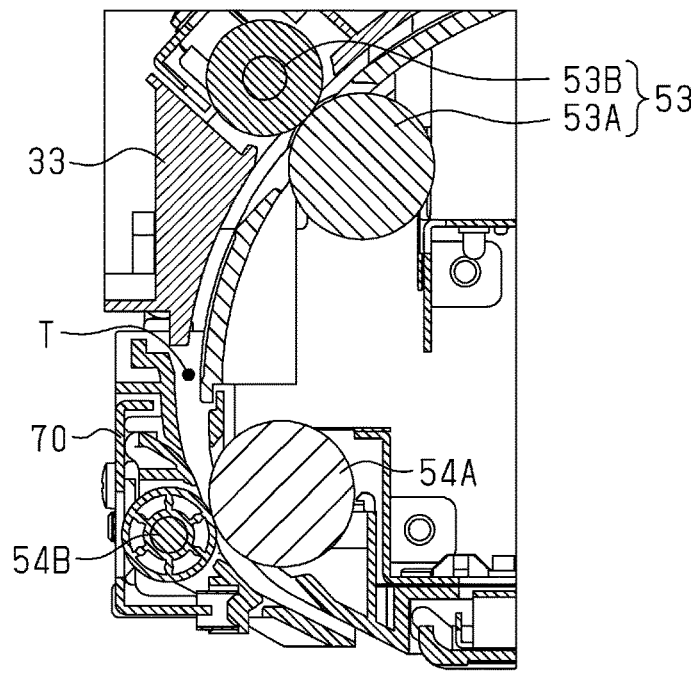
FIG. 8 is a sectional view of the peripheral structure of the holder member.
Figure 9:
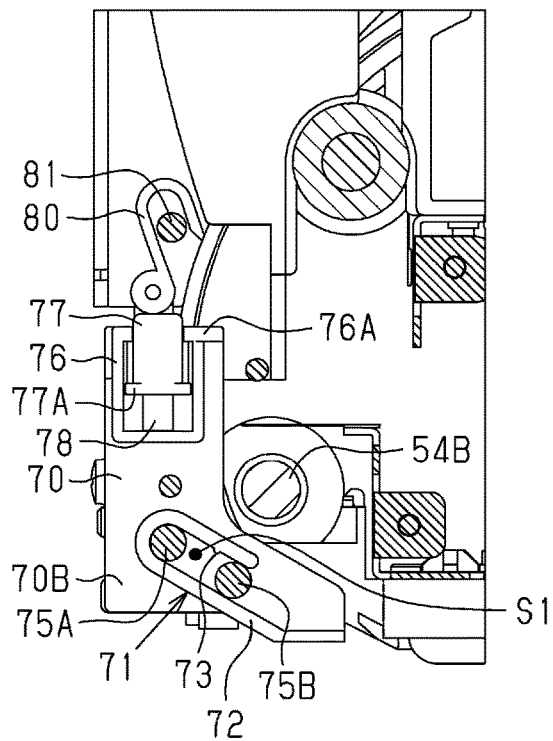
FIG. 9 is a sectional view of the peripheral structure of the holder member.

As illustrated in FIGS. 8 and 9, when the cover 33 is in the closed position, the lower end edge of the cover 33 is in a state of pressing the pressing member 77 downward in the vertical direction against the urging force of the coil spring 78. At the lower end edge of the cover 33, a lock portion 80, which is curved so as to be substantially U-shaped, is provided so as to open downward in the vertical direction. A tip end portion of an engagement pin 81 is inserted into the lock portion 80. The engagement pin 81 is fastened to, for example, the pair of the support frames 62. The engagement pin 81 has a cylindrical shape, and the tip end portion of the engagement pin 81 is inserted into the lock portion 80. In this case, the outer diameter of the tip end portion of the engagement pin 81 is substantially the same as the opening width of the lock portion 80. Therefore, the engagement pin 81 is engaged with the lock portion 80, and the pivoting of the cover 33 from the closed position to the open position is restricted by the engagement pin 81.

Next, the operation of the image reading device 11 according to the present embodiment will be described below, focusing in particular on the operation of the holder member 70 when the cover 33 is displaced from the closed position to the open position.

Now, as illustrated in FIGS. 8 and 9, when the cover 33 is in the closed position, the lock portion 80 of the cover 33 presses the pressing member 77 of the holder member 70 downward against the urging force of the coil spring 78. In this case, the first guide pin 75A is engaged with one end side of the recessed portion space S1 of the holder member 70 in the longitudinal direction. In addition, the third driven rollers 54B held by the holder member 70 are in close contact with the third driving roller 54A.

Figure 10A:
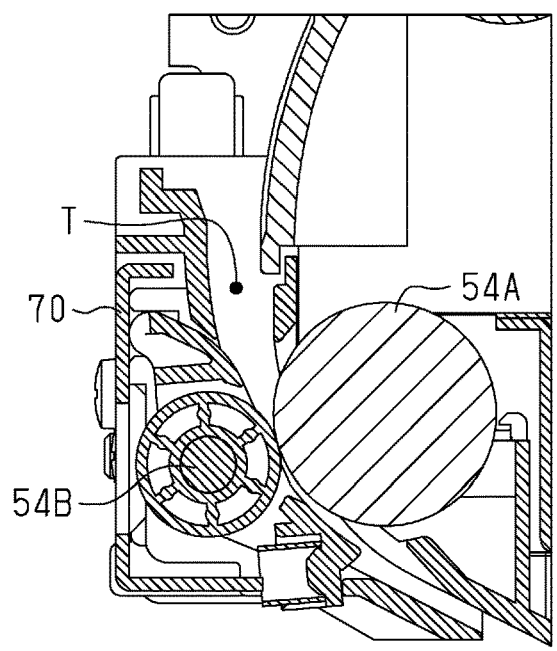
FIG. 10A is an operation diagram of the holder member.
Figure 10B:
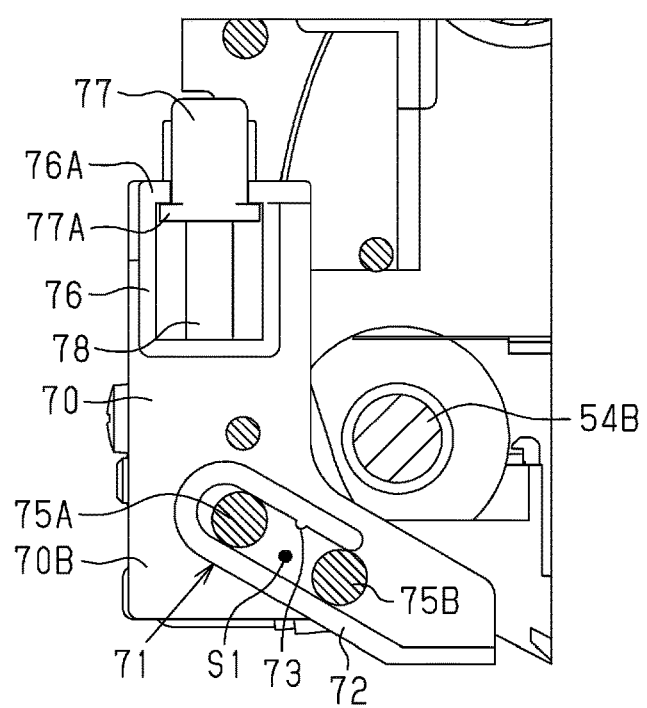
FIG. 10B is an operation diagram of the holder member.

Here, as illustrated in FIGS. 10A and 10B, when the cover 33 is displaced from the closed position to the open position after removing the engagement pin 81 from the lock portion 80 of the cover 33 to unlock the cover 33, the pressing member 77 of the holder member 70 is released from the pressing from the lock portion 80 of the cover 33. Therefore, the pressing member 77 of the holder member 70 moves upward in the vertical direction to a position where the flange portion 77A of the pressing member 77 is engaged with the rib 76A of the support frame 76 in accordance with the urging force of the coil spring 78. In addition, because the pressing from the cover 33 to the holder member 70 is released, the engagement of the first guide pin 75A with one end side of the recessed portion space S1 of the holder member 70 in the longitudinal direction is also released. In this case, the first guide pin 75A and the second guide pin 75B can move along the longitudinal direction of the recessed portion space S1 of the holder member 70. The holder member 70 is movably supported by the pair of the support frames 62. Therefore, the third driven rollers 54B held by the holder member 70 are separated from the third driving roller 54A, and the contact with the third driving roller 54A is released. That is, the holder member 70 separates the third driven rollers 54B from the third driving roller 54A in conjunction with the displacement of the cover 33 from the open position to the closed position.

Figure 11A:
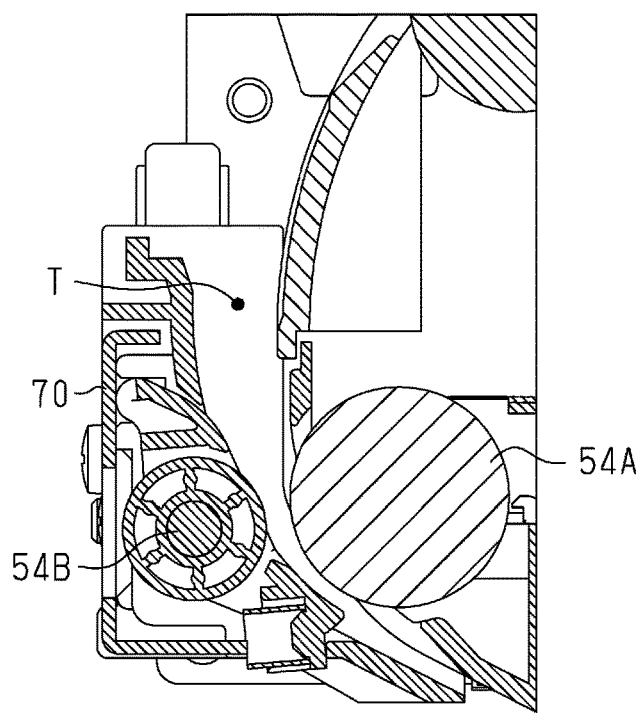
FIG. 11A is an operation diagram of the holder member.
Figure 11B:
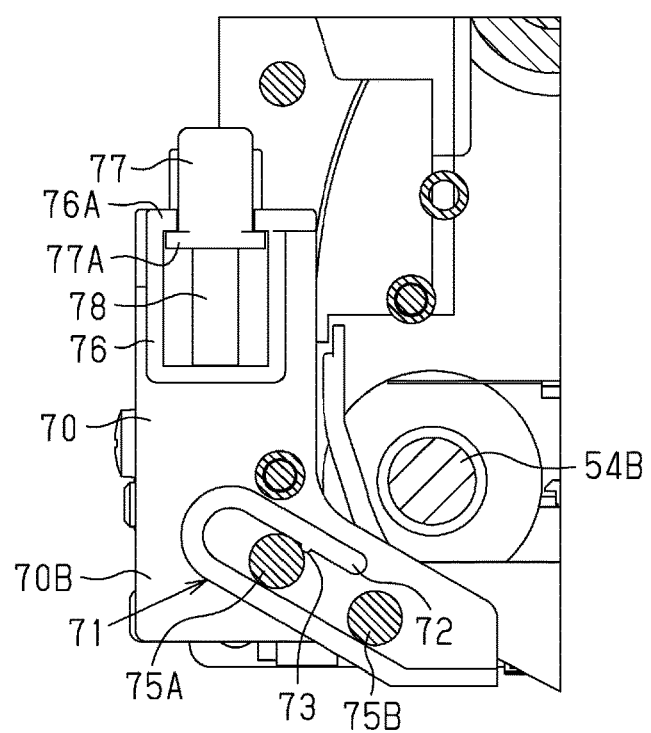
FIG. 11B is an operation diagram of the holder member.

Subsequently, as illustrated in FIGS. 11A and 11B, the holder member 70 is moved upward in the vertical direction. In this case, in the holder member 70, the recessed portion space S1 is engaged with the first guide pin 75A and the second guide pin 75B. Therefore, the movement direction of the holder member 70 is restricted along the longitudinal direction of the recessed portion space S1. Then, when the first guide pin 75A moves to a position where it locks to the locking portion 73 provided at the opening edge of the recessed portion space S1, the second guide pin 75B moves to a position out of the recessed portion space S1. In this case, the holder member 70 is pivotable around the first guide pin 75A because only the first guide pin 75A is inserted into the recessed portion space S1.

Figure 12A:
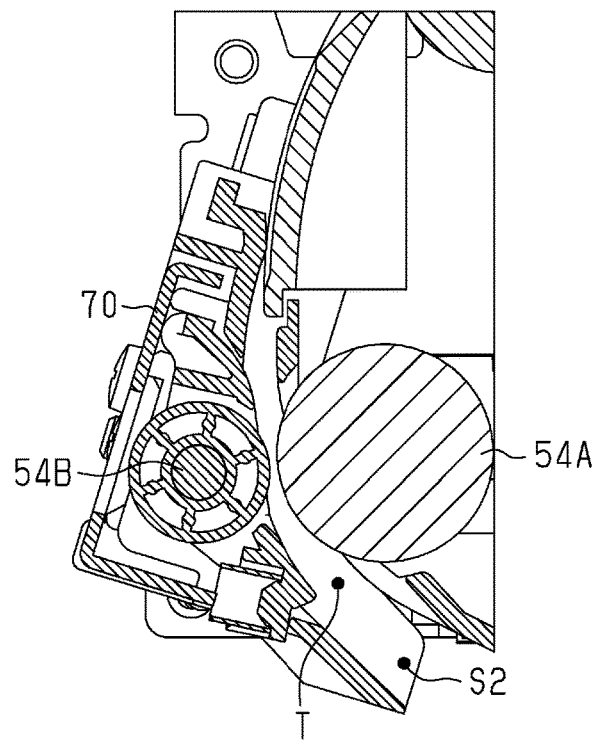
FIG. 12A is an operation diagram of the holder member.
Figure 12B:
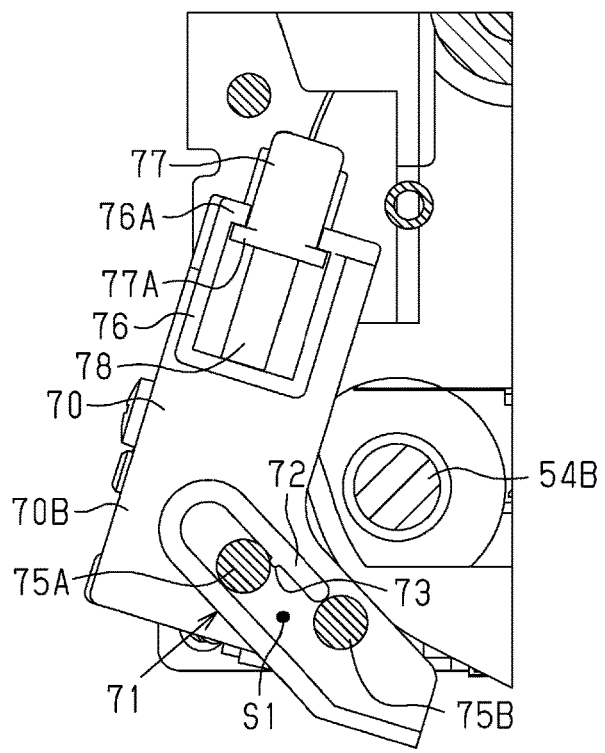
FIG. 12B is an operation diagram of the holder member.

As illustrated in FIGS. 12A and 12B when the holder member 70 rotates about the first guide pin 75A, a space S2 is secured between the lower end portion of the holder member 70 and the frame main body 61. Therefore, even if a document transport jam occurs between the third driving roller 54A and the third driven rollers 54B, the document can be taken out through the space S2. In addition, when the holder member 70 is moved further upward from the state illustrated in the figure, the locking of the first guide pin 75A by the locking portion 73 is released. Therefore, it is also possible to remove the holder member 70 from the frame structure 60 of the image reading device 11.

Next, the operation of the image reading device 11 of the present embodiment will be described.

When the ADF unit 32 reads an image of a document, the document may cause a transport jam at an intermediate position of the transport path T. In this case, in order to take out the document that has caused the transport jam from the transport path T, it is necessary to release the nipping between the driving roller and the driven roller disposed on the transport path T.

However, when the driven roller is provided on the cover that opens and closes the transport path T, in a case where the cover is vigorously moved from the open position to the closed position, the driven roller supported by the cover may collide with the driving roller and both the rollers may be damaged.

In this respect, in the present embodiment, the third driven rollers 54B are held by the holder member 70, which is provided as a separate member from the cover 33. Then, when the cover 33 is moved from the closed position to the open position, by releasing the pressing from the cover 33 to the holder member 70, the nipping between the third driven rollers 54B held by the holder member 70 and the third driving roller 54A is released. Therefore, regardless of the mode of operation when moving the cover 33 from the open position to the closed position, the nipping between the third driving roller 54A and the third driven rollers 54B is smoothly released.

In addition, in the present embodiment, not only is the holder member 70 configured to move in the longitudinal direction of the recessed portion space S1, but the holder member 70 is also configured to rotate about the first guide pin 75A. Therefore, as compared with the configuration in which the holder member 70 can only be moved in one direction, space saving of the image reading device 11 can be achieved, and a document that has caused a transport jam can be taken out quickly from the transport passage T.

In addition, in the present embodiment, the holder member 70 is configured to be removed from the frame main body 61. Therefore, the operability at the time of taking out a document that has caused a transport jam from the transport path T is further improved.

In addition, in the present embodiment, by removing the engagement pin 81 from the lock portion 80 of the cover 33, the fixation of the cover 33 in the closed position is released. Therefore, the operability at the time of displacing the cover 33 from the closed position to the open position is improved, and a document that has caused a transport jam can be taken out quickly from the transport path T.

As described above, according to the above embodiment, the following effects can be obtained.

(1) The third driving roller 54A is provided on the frame main body 61, and the third driven rollers 54B are provided on the holder member 70. Then, when the cover 33 is displaced from the closed position to the open position, the holder member 70 is moved so as to release the holding of the document between the third driving roller 54A and the third driven rollers 54B. Therefore, regardless of the mode of operation when moving the cover 33 from the open position to the closed position, the nipping of the third driving roller 54A and the third driven rollers 54B can be smoothly released.

(2) The holder member 70 has the guide portion 71 for guiding the movement direction thereof when the cover 33 is in the open position. Therefore, the operability at the time of taking out a document that has caused a transport jam from the transport path T can be improved.

(3) The holder member 70 is configured to pivot by the guide portion 71 when the cover 33 is in the open position. Therefore, as compared with the configuration in which the holder member 70 can only be moved in one direction, space saving of the image reading device 11 can be achieved, and the document that has caused the transport jam can be taken out quickly from the transport path T.

(4) The holder member 70 is configured to be removed when the cover 33 is in the open position. Therefore, the operability at the time of taking out a document that has caused a transport jam from the transport path T can be improved.

(5) The ridges 72 extend along the movement direction of the holder member 70, and the first guide pin 75A and the second guide pin 75B engage with the ridges 72 so as to be movable in the longitudinal direction of the ridges 72. Therefore, the operability at the time of taking out the document that has caused the transport jam from the transport path T can be further improved.

(6) The cover 33 has the lock portion 80 that locks the movement of the holder member 70 toward the open position when disposed in the closed position, and, between the cover 33 and the holder member 70, the coil spring 78 is provided that urges the cover 33 disposed in the closed position toward the open position. Therefore, when the lock of the cover 33 by the lock portion 80 is released, the cover 33 can be smoothly moved from the closed position to the open position in accordance with the urging force from the coil spring 78.

Further, the above embodiment may be modified as illustrated in the following modifications. Furthermore, a combination of the above-described embodiment and the modifications illustrated below may be used as a further modification, or a combination of the modifications illustrated below may be used as a further modification.

In the above embodiment, the lock portion 80 for locking the movement of the cover 33 toward the open position does not necessarily have to be have a hook shape, and, for example, it may have a configuration that can lock the movement of the cover 33, such as a claw shape.

In the above embodiment, the coil spring 78 that urges the cover 33 disposed in the closed position toward the open position may be omitted.

In the above embodiment, the holder member 70 may be provided with a guide pin, and a guide portion that engages with the guide pin may be provided on the pair of the support frames 62.

In the embodiment described above, the holder member 70 need not be removable from the frame main body 61.

In the above embodiment, the holder member 70 may be configured so as not to pivot when the cover 33 is in the open position. In this case, the movement direction of the holder member 70 does not have to be linear and, for example, may be curved.

In the above embodiment, the ridges 72 for guiding the movement direction when the cover 33 is in the open position may be omitted from the holder member 70.

In the above embodiment, the rollers held by the holder member 70 do not necessarily have to be the third driven rollers 54B, and may be other rollers disposed on the document transport path T.

Hereinafter, the technical idea grasped from the above-mentioned embodiment and modifications and their effects will be described below.

An image reading device includes: a medium support portion that supports a medium; a supply roller that supplies the medium supported by the medium support portion; a transport path through which the medium supplied by the supply roller from the medium support portion passes; a cover that is displaced between an open position in which the transport path is open and a closed position in which the transport path is closed; a reading unit that reads an image on the medium transported on the transport path; and a transport unit that is disposed on the transport path further upstream than the reading unit and that transports the medium to the reading unit, in which the transport unit includes a driving roller, and a driven roller that nips the medium between the driving roller and the driven roller, in which the driving roller is provided in a first unit, the driven roller is provided in a second unit, and when the cover is displaced from the closed position to the open position, the second unit is moved so as to separate the driven roller away from the driving roller.

According to this configuration, regardless of the mode of operation when moving the cover from the open position to the closed position, the nipping between the driving roller and the driven roller can be released smoothly.

In the image reading device, the second unit may include a guide portion that guides a movement direction of the second unit when the cover is in the open position.

According to this configuration, the operability at the time of taking out a medium that has caused a transport jam can be improved.

In the image reading device, the second unit may be configured to pivot by the guide portion when the cover is in the open position.

Therefore, as compared with a configuration in which the second unit is only moved in one direction, space saving of the image reading device can be achieved, and the document that has caused the transport jam can be taken out quickly from the transport path.

In the image reading device, the second unit may be configured to be removed when the cover is in the open position.

According to this configuration, the operability at the time of taking out a medium that has caused a transport jam can be improved.

In the image reading device, the guide portion may extend along the movement direction of the second unit, and a guide pin may be movably engaged with the guide portion in a longitudinal direction of the guide portion.

According to this configuration, it is possible to further improve the operability at the time of taking out a medium that has caused a transport jam from the transport path.

In the image reading device, the cover may have a lock portion that locks movement of the second unit toward the open position when the cover is disposed in the closed position, and an urging member that urges the cover disposed in the closed position toward the open position may be provided between the cover and the second unit.

According to this configuration, when the lock of the cover by the lock portion is released, the cover can be smoothly moved from the closed position to the open position in accordance with the urging force from the urging member.

What is claimed is:

1. An image reading device comprising:
   a medium support portion that supports a medium;
   a supply roller that supplies the medium;
   a transport path through which the medium supplied by the supply roller passes;
   a cover that is displaced between an open position in which the transport path is open and a closed position in which the transport path is closed;
   a reading unit that reads an image on the medium transported on the transport path; and
   a transport unit that is disposed on the transport path further upstream than the reading unit and that transports the medium to the reading unit, wherein
   the transport unit includes:
   a driving roller, and a driven roller that nips the medium between the driving roller and the driven roller, wherein the driving roller is provided in a first unit, the driven roller is provided in a second unit, and when the cover is displaced from the closed position to the open position, the second unit is moved so as to separate the driven roller away from the driving roller.

2. The image reading device according to claim 1, wherein the second unit includes a guide portion that guides a movement direction of the second unit when the cover is in the open position.

3. The image reading device according to claim 2, wherein the second unit is configured to pivot by the guide portion when the cover is in the open position.

4. The image reading device according to claim 2, wherein the second unit is configured to be removed when the cover is in the open position.

5. The image reading device according to claim 2, wherein the guide portion extends along the movement direction of the second unit, and a guide pin is movably engaged with the guide portion in a longitudinal direction of the guide portion.

6. The image reading device according to claim 1, wherein the cover has a lock portion that locks movement of the second unit toward the open position when the cover is disposed in the closed position, and an urging member that urges the cover disposed in the closed position toward the open position is provided between the cover and the second unit.

\* \* \* \* \*